US012676760B2

(12) United States Patent
Birnel et al.

(10) Patent No.: US 12,676,760 B2
(45) Date of Patent: Jul. 7, 2026

(54) MACHINE LEARNING TECHNIQUES FOR AUTOMATED DOCUMENT AND ORGANIZATION VALIDATION

(71) Applicant: DigiCert, Inc., Lehi, UT (US)

(72) Inventors: Daniel Birnel, Salt Lake City, UT (US); Tyler Simpson, Salt Lake City, UT (US); Ren Peterson, St. George, UT (US); Avesta Hojjati, Austin, TX (US)

(73) Assignee: DigiCert, Inc., Lehi, UT (US)

( * ) Notice: Subject to any disclaimer, the term of this patent is extended or adjusted under 35 U.S.C. 154(b) by 52 days.

(21) Appl. No.: 18/731,619

(22) Filed: Jun. 3, 2024

(65) Prior Publication Data

US 2025/0373450 A1     Dec. 4, 2025

(51) Int. Cl.
*H04L 9/32* (2006.01)

(52) U.S. Cl.
CPC ................................. *H04L 9/3268* (2013.01)

(58) Field of Classification Search
CPC .................................................... H04L 9/3268
See application file for complete search history.

(56) References Cited

U.S. PATENT DOCUMENTS

| | | | |
|---|---|---|---|
| 2016/0078022 A1* | 3/2016 | Lisuk ..................... | G06N 20/00 706/12 |
| 2022/0197986 A1* | 6/2022 | Zizi ..................... | H04L 63/0861 |
| 2023/0061009 A1* | 3/2023 | Peng ..................... | G06V 10/26 |
| 2023/0300129 A1 | 9/2023 | Hojjati et al. | |
| 2023/0344639 A1 | 10/2023 | Hojjati | |
| 2023/0344650 A1 | 10/2023 | Hojjati | |
| 2023/0385811 A1 | 11/2023 | Naidoo et al. | |
| 2024/0096051 A1 | 3/2024 | Gopalakrishna et al. | |

\* cited by examiner

*Primary Examiner* — Hany S. Gadalla
(74) *Attorney, Agent, or Firm* — Baratta Law PLLC; Lawrence A. Baratta, Jr.

(57)     ABSTRACT

Systems and methods for validating documents, organization, and individuals are provided, utilizing both automated and manually controlled validation checks. In one implementation, a method includes a step of receiving a request to perform a validation analysis with respect to an organization, wherein the validation analysis includes Machine-Learning (ML) procedures for checking multiple validation metrics. In response to gathering multiple documents relevant for performing the validation analysis, the method further includes a step of extracting data from each of the multiple documents relevant for checking the multiple validation metrics. Also, the method includes a step of accepting manual assistance from a validation specialist when needed for performing the validation analysis.

20 Claims, 9 Drawing Sheets

*160*

*10*

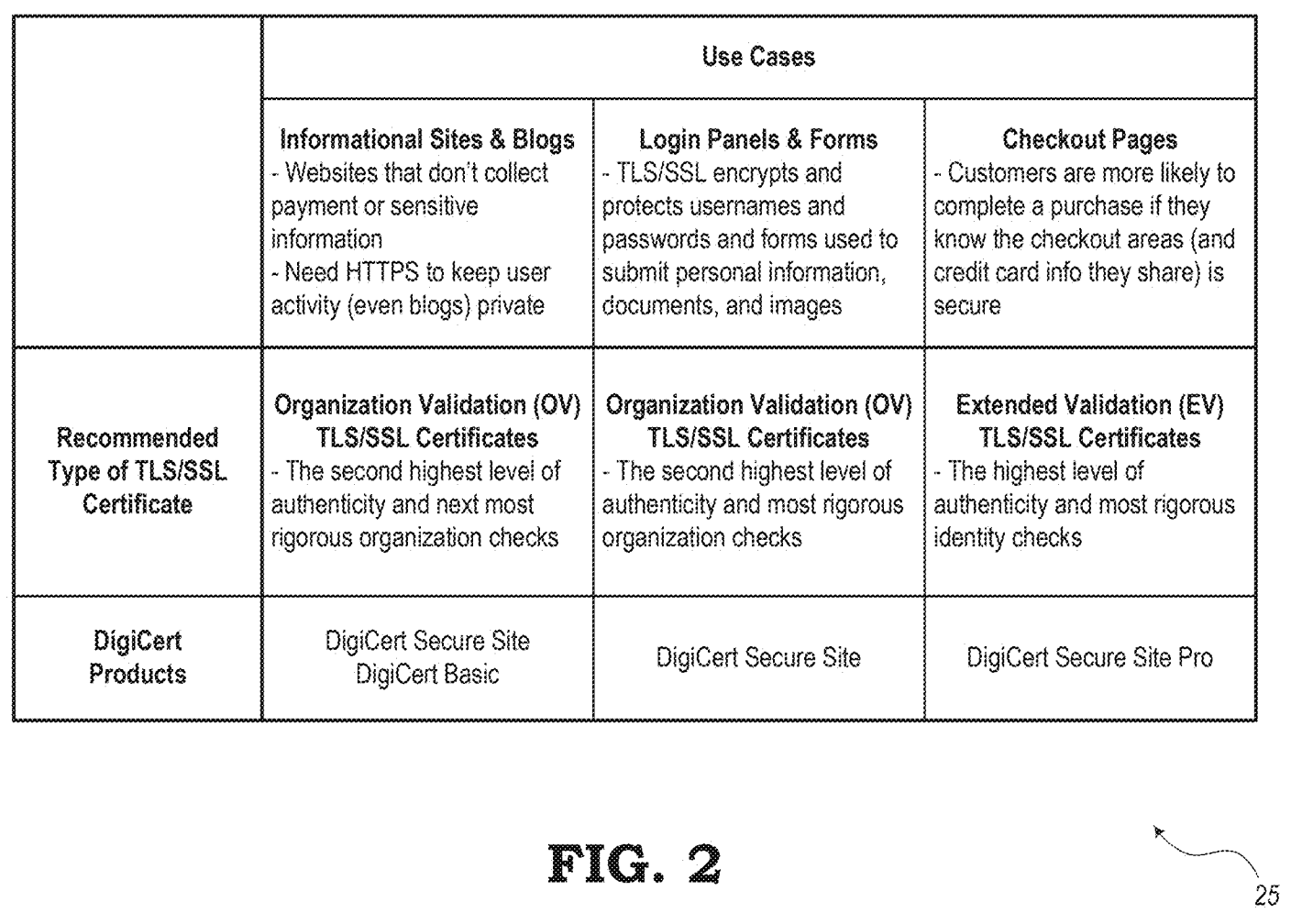

25

| Use Cases | | |
|---|---|---|
| Informational Sites & Blogs<br>- Websites that don't collect payment or sensitive information<br>- Need HTTPS to keep user activity (even blogs) private | Login Panels & Forms<br>- TLS/SSL encrypts and protects usernames and passwords and forms used to submit personal information, documents, and images | Checkout Pages<br>- Customers are more likely to complete a purchase if they know the checkout areas (and credit card info they share) is secure |
| Recommended Type of TLS/SSL Certificate | | |
| Organization Validation (OV) TLS/SSL Certificates<br>- The second highest level of authenticity and next most rigorous organization checks | Organization Validation (OV) TLS/SSL Certificates<br>- The second highest level of authenticity and most rigorous organization checks | Extended Validation (EV) TLS/SSL Certificates<br>- The highest level of authenticity and most rigorous identity checks |
| DigiCert Products | | |
| DigiCert Secure Site<br>DigiCert Basic | DigiCert Secure Site | DigiCert Secure Site Pro |

FIG. 2

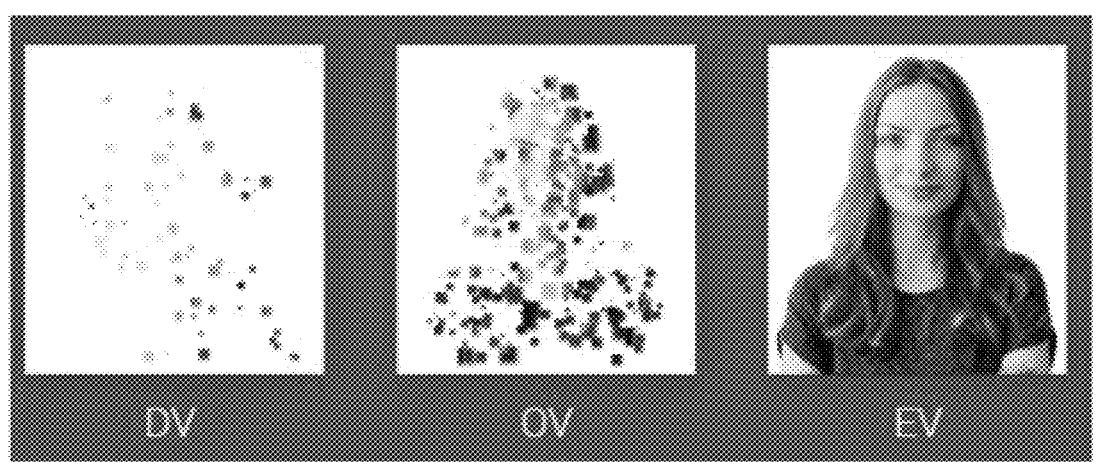
FIG. 3
16
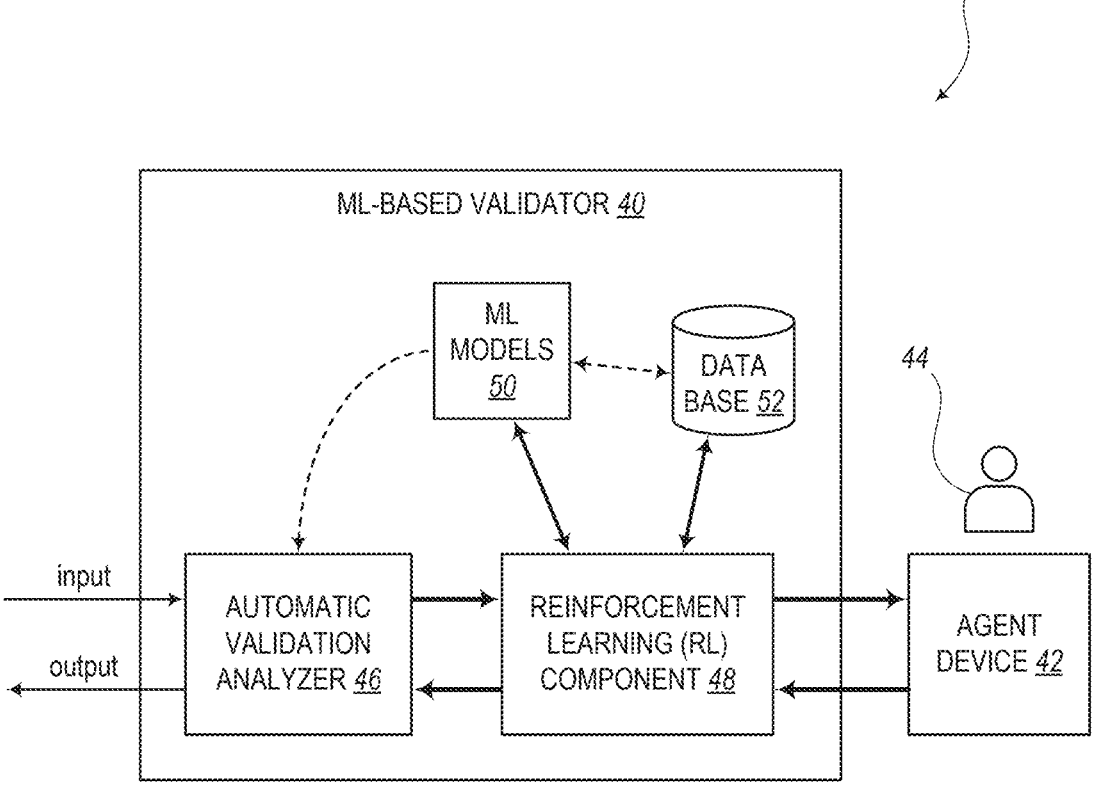
FIG. 4

AUTO-VALIDATION

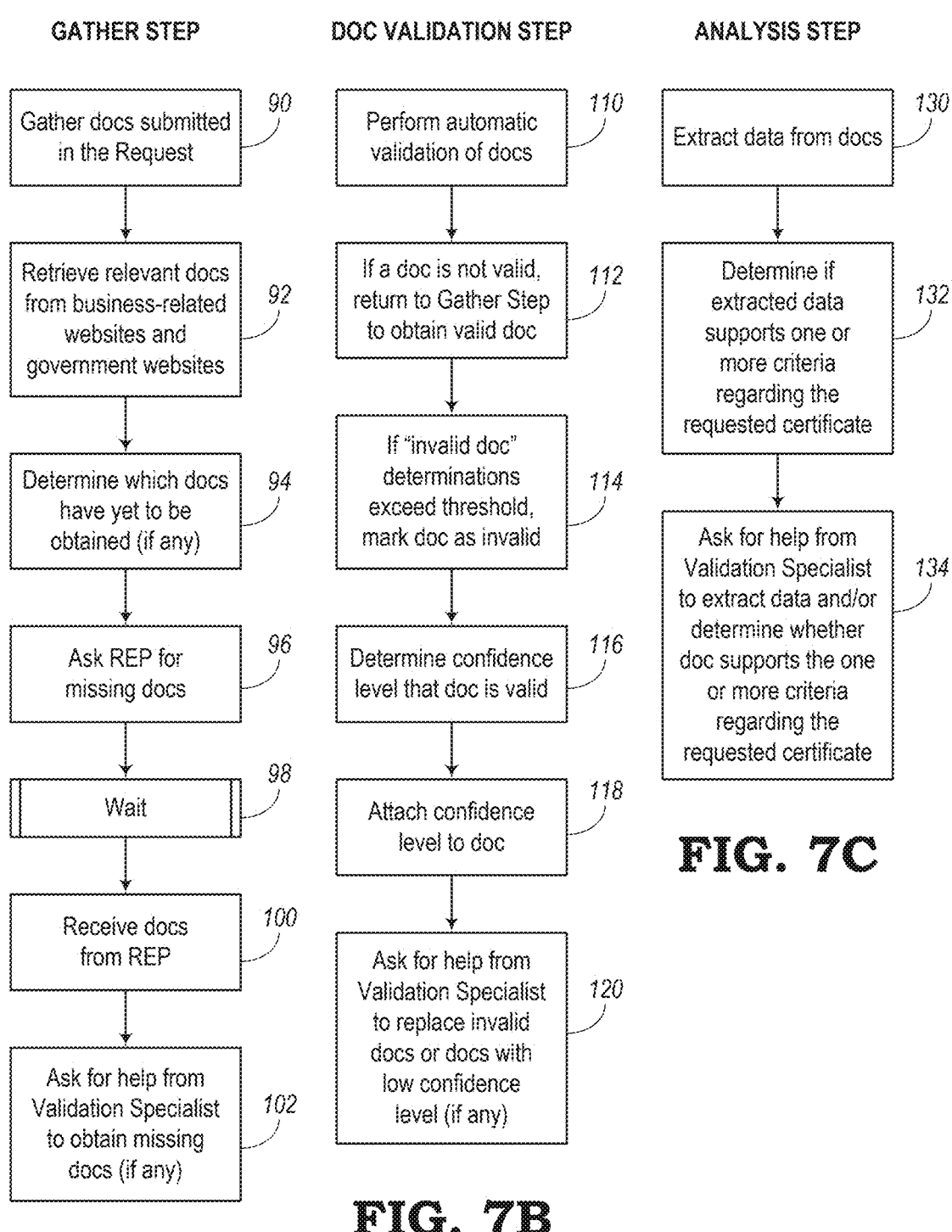

| GATHER STEP | DOC VALIDATION STEP | ANALYSIS STEP |
|---|---|---|

GATHER STEP

Gather docs submitted in the Request — 90

Retrieve relevant docs from business-related websites and government websites — 92

Determine which docs have yet to be obtained (if any) — 94

Ask REP for missing docs — 96

Wait — 98

Receive docs from REP — 100

Ask for help from Validation Specialist to obtain missing docs (if any) — 102

FIG. 7A

DOC VALIDATION STEP

Perform automatic validation of docs — 110

If a doc is not valid, return to Gather Step to obtain valid doc — 112

If "invalid doc" determinations exceed threshold, mark doc as invalid — 114

Determine confidence level that doc is valid — 116

Attach confidence level to doc — 118

Ask for help from Validation Specialist to replace invalid docs or docs with low confidence level (if any) — 120

FIG. 7B

ANALYSIS STEP

Extract data from docs — 130

Determine if extracted data supports one or more criteria regarding the requested certificate — 132

Ask for help from Validation Specialist to extract data and/or determine whether doc supports the one or more criteria regarding the requested certificate — 134

| Agent Device UI | — ☐ ✕ |
| --- | --- |

CASE FILE:    A433T43

Organization:    Org ABC

Address:    1234 Random Street
Anywhere, AA 99999

Contact Rep.:    Jane Doe

Phone No.:    555-555-1234

Task: Organization Validation (OV)

*142*

Pass to Issue

| | Received? | Valid? | Confidence Level | | Data Extracted? | Validation Metric Supported? | Confidence Level |
| --- | --- | --- | --- | --- | --- | --- | --- |
| Doc #1 | ☑ | ☑ | 95 | Check #1 | ☑ | ☑ | 99 |
| Doc #2 | ☑ | ☑ | 99 | Check #2 | ☑ | ☑ | 97 |
| Doc #3 | ☑ | ☑ | 98 | Check #3 | ☑ | ☑ | 98 |
| ⋮ | | | | ⋮ | | | |
| Doc #m | ☑ | ☑ | 98 | Check #n | ☑ | ☑ | 99 |

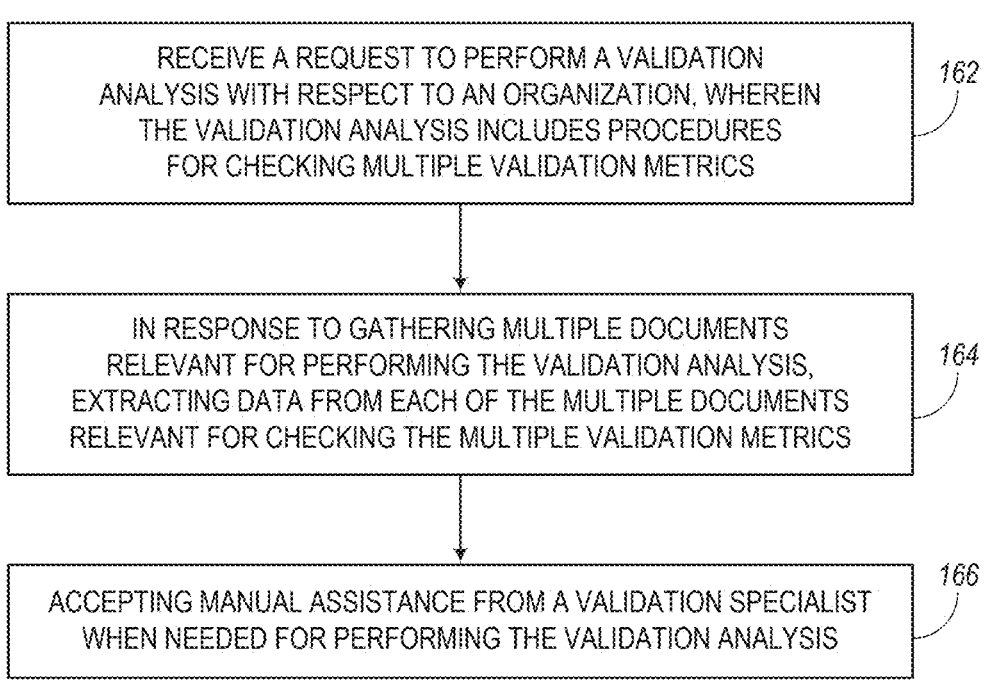

*160*

RECEIVE A REQUEST TO PERFORM A VALIDATION
ANALYSIS WITH RESPECT TO AN ORGANIZATION, WHEREIN
THE VALIDATION ANALYSIS INCLUDES PROCEDURES
FOR CHECKING MULTIPLE VALIDATION METRICS     *162*

IN RESPONSE TO GATHERING MULTIPLE DOCUMENTS
RELEVANT FOR PERFORMING THE VALIDATION ANALYSIS,
EXTRACTING DATA FROM EACH OF THE MULTIPLE DOCUMENTS
RELEVANT FOR CHECKING THE MULTIPLE VALIDATION METRICS     *164*

ACCEPTING MANUAL ASSISTANCE FROM A VALIDATION SPECIALIST
WHEN NEEDED FOR PERFORMING THE VALIDATION ANALYSIS     *166*

FIG. 11

MACHINE LEARNING TECHNIQUES FOR AUTOMATED DOCUMENT AND ORGANIZATION VALIDATION

FIELD OF THE DISCLOSURE

The present disclosure relates generally to computing systems and digital certificates, namely X.509 certificates. More particularly, the present disclosure relates to systems and methods for using Machine Learning (ML) techniques for automatically validating documents, organizations, and individuals in cooperation with assistance from a validation specialist, such as in conjunction with certificate issuance.

BACKGROUND

There is a need to validate documentation for various purposes, such as in conjunction with X.509 certificate issuance. The documents can include, e.g., driver's licenses, business records, government documents, and the like. These documents can be digitized, i.e., in electronic format, and there is a need to validate such documents, i.e., determine their authenticity. Currently, the process of document validation is often a manual and time-consuming process and can be prone to human error. It involves labor-intensive scrutiny of documents to verify their accuracy and authenticity, which at times can be inefficient. This traditional approach struggles to keep up with a high volume and differing complexity of documents needing validation today, which can lead to bottlenecks and increased risk of oversight and fraud. Additionally, maintaining compliance with evolving standards and ensuring secure handling of sensitive information remain significant challenges.

BRIEF SUMMARY

The present disclosure relates to systems and methods for validating documents and organizations using an automated approach in cooperation with a manually controlled approach. The automated device may use Machine Learning (ML) techniques for performing validation services. According to one implementation, the systems and methods may include ML-assisted validation programming code that includes receiving a request to perform a validation analysis with respect to an organization. For example, the validation analysis is configured to include procedures for checking multiple validation metrics. In response to gathering multiple documents relevant for performing the validation analysis, a further step includes extracting data from each of the multiple documents relevant for checking the multiple validation metrics. Also, a step includes accepting the manual assistance from a validation specialist when needed for performing the validation analysis.

In additional embodiments, the step of gathering the multiple documents may include a) receiving one or more documents submitted along with the request, b) retrieving one or more documents from relevant websites, and/or c) requesting and receiving missing documents from a representative of the organization. The step of accepting the manual assistance further includes asking the validation specialist to obtain any missing documents needed for performing the validation analysis.

In some cases, the instructions of the ML-assisted validation program may further enable the processing device to perform one or more of the steps of: a) determining whether each of the multiple documents is valid or invalid, and b) determining a confidence level for each of the multiple documents representing assurance that the respective document is valid. In response to determining that a document of the multiple documents is invalid or has a confidence level below a predetermined threshold, the instructions further enable the processing device to perform the steps of a) gathering a replacement document for replacing the invalid or low-confidence document, and b) determining whether the replacement document is valid or invalid or whether a confidence level of the replacement document is above or below the predetermined threshold.

Furthermore, the step of checking the multiple validation metrics may include verifying whether or not the extracted data supports one or more criteria regarding the validation analysis. The request to perform the validation analysis, for example, may be a Certificate Signing Request (CSR) for obtaining a digital certificate with respect to the organization. The request may be received from a representative device used by an administrator of the organization, and wherein the validation analysis includes a verification process for verifying an identity of the administrator Also, the ML-assisted validation program 74 may include instructions enabling the processing device to utilize Reinforcement Learning (RL) to revise the ML-assisted validation program based on manual assistance from the validation specialist. In some cases, the validation analysis may be an Organization Validation (OV) analysis or an Extended Validation (EV) analysis. Also, the ML-based validator may be part of a Certificate Authority.

In various embodiments, the present disclosure includes a) methods having the above-mentioned steps, b) processing devices configured to implement the above-mentioned steps, c) cloud services configured to implement the above-mentioned steps, and d) non-transitory computer-readable media storing instructions for programming one or more processors to execute the above-mentioned steps.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a table illustrating recommended categories of validation products for handling various network security practices, according to various embodiments.

FIG. 3 is a diagram providing a visual representation of different levels of trust for certificates based on different levels of validation, according to various embodiments.

FIG. 4 is a block diagram illustrating the Certificate Authority (CA) shown in FIG. 1, according to various embodiments of the present disclosure.

FIGS. 7A-7C are flow diagrams illustrating various steps of an auto-validation procedure, according to various embodiments.

FIG. 11 is a flow diagram illustrating a method for automatically validating documents, according to various embodiments.

DETAILED DESCRIPTION

Figure 1:
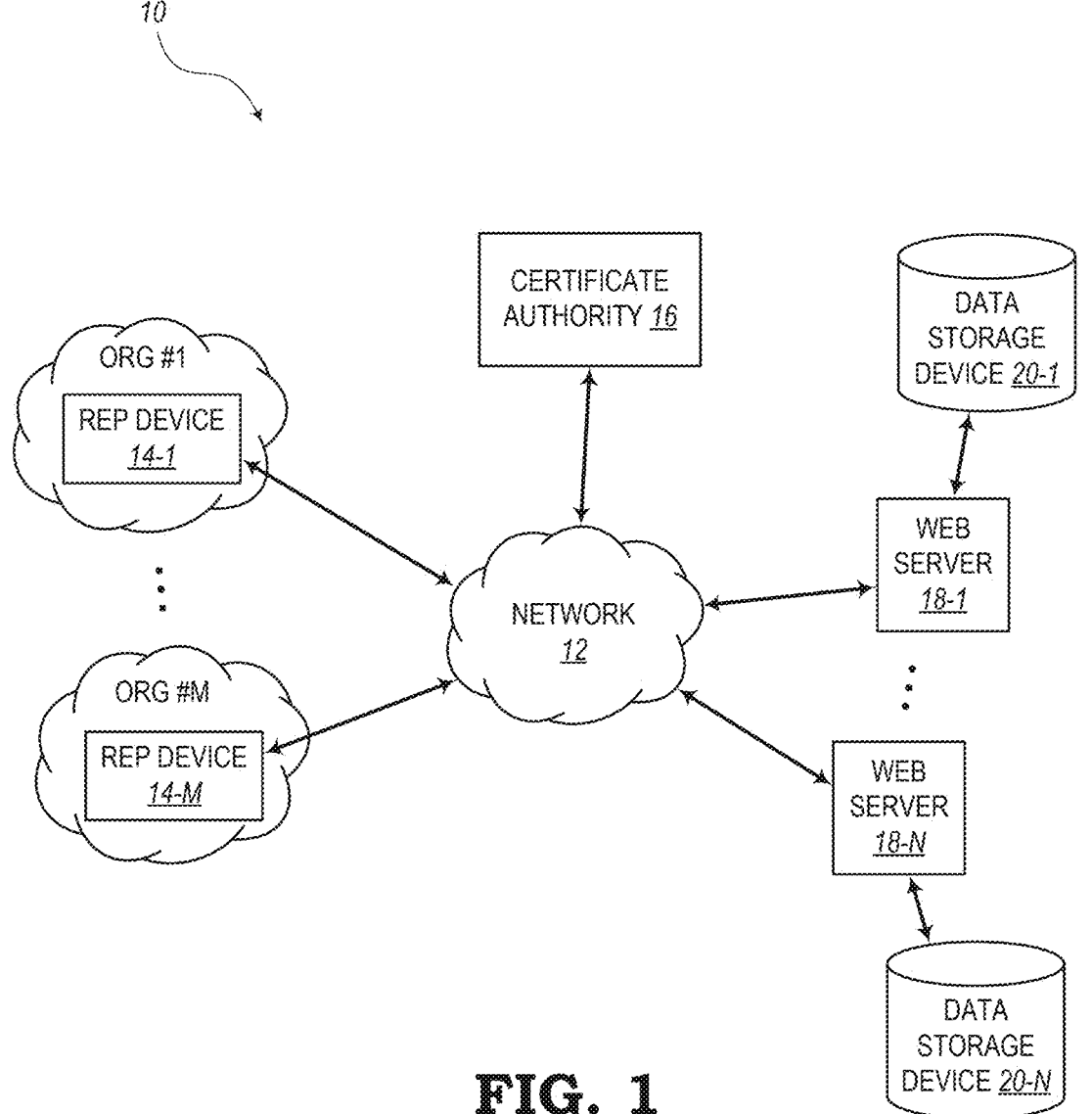
FIG. 1 is a diagram illustrating a communication system for enabling the creation and distribution of digital certificates, according to various embodiments.

Again, the present disclosure relates to systems and methods for automatically validating documents, organizations, and people within an organization, such as by using Machine Learning (ML) methodologies. Also, again, traditional procedures for validating documents are normally performed manually and can be time-consuming for validation specialists (or validation agents). When scrutinizing multiple documents and organizations to verify authenticity, a validation specialist, if overworked, can be prone to human error. Also, using the traditional approaches, a validation special might struggle to keep up with demand. Therefore, to meet the need for automated or ML-based assistance for validation purposes, the present disclosure provides systems and methods that can handle a share of the load to ease the burden of the validation specialist.

For example, in many cases, ML methods may be able to handle clear-cut or straight-forward validation steps for some or all validation metric checks involved in a specific validation request, particularly in countries, states, or other jurisdictions where identity and business laws are well defined and enforced properly. In a sense, the ML techniques described herein may be used to handle the "low-hanging fruit" with regard to the validation specialist's docket. That is, the easier cases which do not require much scrutiny. Then, when issues cannot be easily resolved by automated methods, the validation specialist can be consulted to handle the more complex cases.

Thus, the present disclosure describes systems and methods for a validation product that involve both automated (or ML-based) steps along with human-assistance, as needed, to resolve issues and/or to confirm the effectiveness of the automated systems. Any feedback from the validation specialist can be presented in a Reinforcement Learning (RL) type of manner to allow the automated systems to revise a ML model. Also, past and present data obtained with respect to validation can be used to train and/or retrain the ML models.

As a result, the systems and methods of the present disclosure are configured to overcome some of the issues of conventional systems and can allow a team of validation specialists to handle more validation requests, thereby reducing any bottlenecks in the workflow. Also, ML models can automatically keep up with updates in business laws that may affect validation criteria, document style, types, etc. Furthermore, with automated help, the validation processes can be performed in an unbiased manner and can detect human oversights or potential fraud.

Again, the present disclosure addresses the conventional issues by leveraging advanced Artificial Intelligence (AI)

and ML technologies to automate and enhance the document validation process. The present disclosure introduces an intuitive interface for easily uploading documents, which are then automatically processed and organized based on their content. By automatically extracting and analyzing key information, the systems are configured to apply various sophisticated algorithms to validate accuracy and authenticity and/or identify inconsistencies or unusual patterns for further review. The systems and methods described herein not only accelerate the validation process, but also minimize the risk of human error. The systems and methods may include continuous learning mechanisms (e.g., RL) to improve accuracy over time, such as by adapting to new data and changing validation requirements. Furthermore, the systems and methods of the present disclosure are configured to ensure secure document handling and compliance with regulatory standards, offering a comprehensive and efficient solution for validating various document types.

Systems Involving Digital Certificates and Validation

FIG. 1 is a diagram illustrating an embodiment of a communication system 10, which may be configured, among other things, to enable the creation and distribution of digital certificates. The communication system 10 is shown in a simplified form and may include multiple other devices. However, in order to simplify the discussion of the embodiments of the present disclosure, the embodiment of FIG. 1 shows the primary components involved with the handling of digital certificates, such as X.509 certificates.

In particular, digital certificates may be associated with or require various types of validation, verification, authentication, certification, trust, etc. Validation may refer to the process of checking whether information related to an individual or entity requesting a digital certificate is properly formatted and contains accurate information according to the standards set for that type of certificate. Validation may also involve ensuring that the documents has been issued by valid sources, are not expired, etc. The validation may be performed by a trusted Certificate Authority (CA), such as CA 16 shown in FIG. 1.

Validating information by the CA 16 before issuing an X.509 certificate is crucial for several reasons:

(1) Authentication and Trust: The primary purpose of an X.509 certificate is to authenticate the identity of the certificate holder. By validating the information, the CA 16 ensures that the entity requesting the certificate is who they claim to be. This builds trust among users who rely on the certificate to verify the identity of the entity.

(2) Preventing Fraud and Misuse: Without proper validation, malicious entities could obtain certificates under false pretenses. This could lead to fraudulent activities such as phishing, man-in-the-middle attacks, and other forms of cybercrime. Validation helps prevent such misuse.

(3) Maintaining Integrity of the PKI: Public Key Infrastructure (PKI) relies on a hierarchy of trust. If the CA 16 issues certificates without proper validation, it undermines the entire PKI system. Users would lose confidence in the security and reliability of digital certificates, weakening the overall security ecosystem.

(4) Legal and Regulatory Compliance: Many industries and governments have regulations and standards (e.g., GDPR, HIPAA, PCI DSS) that require stringent validation of digital identities. The CA 16 must comply with these regulations to ensure that certificates are issued legally and meet industry standards.

(5) Data Security and Confidentiality: Validating information ensures that the encryption keys associated with the certificates are issued to the rightful owners. This protects the confidentiality and integrity of data transmitted over networks, as only authorized parties can decrypt and access the information.

(6) Avoiding Liability: the CA 16 has a responsibility to ensure the accuracy and legitimacy of the certificates they issue. Failing to validate information properly can result in legal liability if a fraudulent certificate leads to financial loss or damage.

As described with respect to FIGS. 2 and 3, validation may relate to Document Validation (DV), Organization Validation (OV), and/or Extended Validation (EV). For example, DV, OV, and EV may have various levels of validation criteria or observable metrics for scrutinizing validity. Of note, these are just one example approach for different levels of validation and those skilled in the art will appreciate this is merely an example. For a validation specialist, document validation involves gathering various documents (e.g., driver's licenses, business records, government documents, etc.) to validate that the person or entity is who they say they are.

Verification may involve confirming the authenticity of a document, which may include checking the document to ensure it was issued by an appropriate entity. Verification may also include additional checks to confirm the identity of a certificate holder.

Authentication is the process of confirming the identity of an entity, such as a user or a network component (e.g., web server 18). In the context of digital certificates, authentication involves using the information contained in a Certificate Signing Request (CSR) to verify the identity of the entity requesting the certificate. This can involve verifying that the entity possesses the corresponding private key to the public key listed in the certificate, as well as other approaches.

Certification refers to the act of issuing a digital certificate by a trusted CA after verifying the identity of the entity requesting the certificate. The certificate serves as a certification of the entity's identity, providing assurance to others that the entity is who it claims to be.

Trust is the confidence that one can have in the authenticity and reliability of a digital certificate. Trust is established through various means, such as relying on trusted CAs to issue certificates, verifying digital signatures, and following secure protocols like Transport Layer Security (TLS) and Secure Sockets Layer (SSL). Trust is essential for ensuring the security of communications and transactions on the internet.

As shown in FIG. 1, the communication system 10 includes a network 12 (e.g., the Internet), a number of organizations (i.e., ORG #1, . . . , ORG #M), which may be any type of entity, such as a business, university, nonprofit, etc. Each organization may include a representative device 14 (i.e., rep device 14-1, . . . 14-M) or multiple rep devices 14, each operated by an admin or other management person who has control over the computing systems within a domain of the organization. With respect to validation processes described in the present disclosure, the user of the rep device 14 may be configured to request trust services from the CA 16 (e.g., DigiCert). These trust services may include DV, OV, EV, as well as multiple other services for validation, verification, identity, security, trust, authentication, etc.

Certificate Authority (CA)

When the user of the rep device 14 places an order or makes a validation request, the team of experts (e.g., validation specialists) at the CA 16 can start the validation process. Some CAs 16 (e.g., DigiCert) validate certificates according to strict guidelines put forth by the Certification Authority Browser Forum. The strictness of these guidelines means that validation does not happen immediately, but the guidelines ensure the type of robust protection that the user can rely on to keep their organization domain secure. It should be noted that validation times may vary (e.g., depending on current workloads and other factors), but the team of validation specialists can work around the clock to issue legitimate certificates as quickly as possible. Cooperation from the users of the rep devices 14-1, . . . , 14-M can help to speed up the validation process.

In addition to the various organizations and the CA 16, which can communicate with each other for the purpose of requesting and performing validation and issuances of certificates, the communication system 10 further includes, as shown in FIG. 1, a plurality of web server 18-1, . . . , 18-N. For example, these web servers 18 may be associated with business-related and/or government-related web sites. The web servers 18 may include webpages, web sites, records, etc. that can be stored in associated data storage devices 20-1, . . . , 20-N, respectively. The data storage devices 20 may include databases or other suitable data stores for storing business records (e.g., status of businesses within a particular jurisdiction), government records (e.g., driver's license information), etc. The web servers 18 may represent certain organizations, such as the Better Business Bureau (BBB), Secretary of State (for each State), Department of Homeland Security, etc.

For checking various validation criteria metrics according to the requested validation analysis, a validation specialist may normally access public records from the various web servers 18 to gather relevant information. This information can then be used to determine if an entity (e.g., organization, person, etc.) meets specific validation requirements. This may include further investigation, as needed, to find missing documents or analyze forms for compliance and authenticity. When each check or metric of a validation analysis is met, the validation specialist can then issue a certificate.

The process of validation in certificate issuance, particularly for digital certificates like SSL/TLS certificates used for securing websites, involves several key steps to ensure the identity of the certificate requester and the security of the data transmission.

Certificate Issuance Process

The following is a breakdown of the general process:

1. Certificate Request

The process begins when an organization or individual ("entity") requests a certificate from the CA 16. This can be done by generating a key pair (a public and a private key) and submitting a Certificate Signing Request (CSR) to the CA 16. The CSR contains the public key along with identification information such as the organization's name, website address, and contact details. Note, the process is described herein with reference to an organization, but those skilled in the art will appreciate this can be an individual or any entity requesting a certificate.

2. Validation

Once the CSR is received, the CA 16 begins the validation process to verify the identity and legitimacy of the requester. The level of validation depends on the type of certificate being requested, with some example levels including:

a) Domain Validation (DV)—The simplest form of validation, where the CA 16 verifies that the applicant has control over the domain listed in the CSR. This is usually done through email verification or by adding a Domain Name System (DNS) record.

b) Organization Validation (OV)—A more thorough check where the CA 16 verifies not only the domain ownership but also the existence and identity of the organization requesting the certificate. This requires additional documentation (e.g., stored in the data storage devices 20-1, . . . , 20-N) to prove the organization's legal existence.

c) Extended Validation (EV)—The most rigorous form of validation, where the CA 16 conducts an in-depth verification of the organization. This includes confirming the physical and operational existence of the entity, as well as verifying the legal and organizational identity through multiple sources. EV certificates are often used by high-profile websites to provide an extra level of trust. Again, documentation can be gathered from the data storage devices 20-1, . . . , 20-N.

3. Issuance

After successful validation, the CA 16 issues the digital certificate. The certificate includes the public key along with information about the certificate's validity (such as the issuance date and the expiration date), the issuing CA 16, and the domain or organization for which the certificate was issued.

4. Installation

The final step involves installing the issued certificate on the server that hosts the website or service associated with the specific domain of the organization. This step ensures that communications between this server and its clients (such as browsers) are encrypted and secure.

5. Renewal

Certificates have a limited validity period, and upon expiration, they need to be renewed. The renewal process often involves revalidation, especially if significant time has elapsed or if organizational details have changed.

This validation process is crucial for maintaining trust in the security of Internet communications, ensuring that sensitive data transmitted online remains secure and that users can confidently verify the authenticity of websites they visit.

When a requester (i.e., user of rep device 14) requests certain types of certificates (e.g., OV, EV), the CA 16 is configured to validate details about their organization, the individual himself or herself, as well as some other checks (e.g., bad lists, fraud check, etc.). Part of the validation process involves collecting various pieces of information (documents) from the web servers 18 as well as the user that are essentially determined to be legitimate, relevant, and/or allowed. These resources can then be used to perform certain checks. The validation specialist may download these documents from the web servers 18, scan through them, and make sure that the documents are valid or suitable for obtaining or extracting the data needed for performing the different validation metrics tests. The validation agent who collects the documents may do a first check (after verifying that the documents are valid or relevant).

It may be noted that, for certain regions (e.g., developed countries), this process can be extremely easy, particularly if the process is well defined and well understood and when policies, rules, laws, etc. are well enforced. For example, many states and governments have easy to use databases to obtain official documents. However, a validation specialist may occasionally run into issues where a more complex case may arise. Instead of being straightforward, these cases may require additional attention and time.

The validation specialist may obtain documents directly from the requestor, either during the initial request or after further inquiry. The validation specialist, in an effort to find relevant documents for validating an organization, may go through government registrations to determine the status of the organization in the particular State (or any other governmental agency) in which they operate or do business or the State in which the organization is registered. Also, documentation can be reviewed to determine if the organization is in a good standing with the State. The validation specialist can also validate the address of the organization, make sure that they are listed in the proper registries, and that the address is valid and up to date. The validation specialist can also perform a business search through a Secretary of State web site associated with the particular State.

Again, these various documents (e.g., stored in the data storage devices 20-1, . . . , 20-N) can be gathered, collected, downloaded, saved, reviewed, etc., as needed, to obtain the needed information for determining validation compliance. The obtained information can be stored in a case file (e.g., digital file) associated with particular validation requests.

In many situations, a majority of validation or certificate orders may be straightforward and can be easy to handle. Therefore, according to the various embodiments of the present disclosure, these orders can be passed off to ML-based systems. Then, if any unusual situations arise or new business or State policies are introduced, the validation specialist can oversee the validation order to determine how to handle new types of documents or business policies. In more complex cases, for example, some documentation or policies may not be up to date in certain countries, states, or jurisdictions and/or the processes may not be as well defined as in certain tightly run jurisdictions. In some cases, multiple validation specialists may need to pool their time and resources to work on a more difficult order or request, in order to gather the documents and analyze the data extracted from the documents to determine various validity metrics.

In a way, both the ML-based systems and manually controlled systems can operate in parallel, together, to allow quicker turnaround on requests. Thus, one purpose of the systems and methods of the present disclosure may essentially be to automate and streamline the verification of the documents uploaded into the case files. Depending on the level of validation requested (e.g., DV, OV, EV, domain validation, code signing, etc.), specific validation analysis is performed. Each validation analysis includes retrieving certain documents and then performing validation checks from data in these documents.

Types of Validation Services

FIG. 2 shows a table 25 that includes recommended categories of validation products for handling various network security practices. An initial validation service (not shown in FIG. 2) may be referred to as a Domain Validation (DV) service. After DV, then Organization Validation (OV) and Extended Validation (EV) services may be provided for added security. For example, for informational sites and blogs, OV TLS/SSL certificates are recommended, such as DigiCert's Secure Site or Basic products. For login panels and forms, OV TLS/SSL certificates again may be recommended. However, for higher security websites, such as checkout pages that include online purchasing capabilities, the EV TLS/SSL certificates may be recommended. Again, these levels are merely presented for illustrative purposes; other approaches are contemplated.

Specifically, Domain Validated (DV) certificates are configured to provide the lowest level of identity authentication, meaning that anonymous entities can get a certificate. For example, Jane Does, both benign and malicious, can remain anonymous at this level. Organization Validated (OV) certificates provide additional checks to ensure identity and brand protection, meaning that Jane Does can no longer hide in the shadows at this level. Furthermore, Extended Validation (EV) certificates guarantee the highest standard of identity and brand protection. With EV, organizations can demonstrate a commitment to customers that transactions are secure. Jane Does are thoroughly identified.

When personal information (e.g., name, residence address, credit card information, Social Security Number, etc.) in on the line, the highest level (i.e., EV) of digital security is typically recommended. Presently, EV and OV certificates are used by 81% of businesses in the Global 2000, 89% of Fortune 500 companies, and 97% of the largest banks worldwide. The list of high-assurance EV & OV TLS/SSL certificate users includes IT companies, utilities companies, retail companies, real estate agencies, insurance companies, automotive companies, telecom companies, and hospital/healthcare companies.

A DV process may be an important initial step that may lead to further security implementations for an organization. The aim of a DV process is to ensure that an organization requesting a certificate does, in fact, have the authority to request a certificate for their domain in question. DV may include emails or phone calls to a contact person (e.g., administrator, admin, web master, host, etc.). This contact person may be listed in a domain's WHOIS record as well as emails to default administrative addresses at the domain. For example, the CA 18 may send an authorization email to administrator@domain.com or webmaster@domain.com. After the DV process (or pre-validation), a requestor (e.g., admin) may begin submitting domains for pre-validation and the type of authorization for which the domain should be validated.

FIG. 3 is a diagram providing a visual representation 30 of different levels of trust for certificates based on different levels of validation. DV, OV, and EV certificates are shown are shown as an example. DV represents a simple start for identifying a Jane Doe; OV adds more detail to identifying the Jane Doe; and EV provides a clear identification of Jane Doe. Thus, the TLS/SSL certificates and digital trust can give customers a clearer picture of who you are. Jane Doe may be an anonymous, unidentifiable Internet user whose actions cannot be tracked. This user may be a benign user or a malicious user. However, without sufficient identity, Jane Doe may remain anonymous and trusting this user with personal information would clearly be inadvisable.

Therefore, as shown in FIG. 3 and as described in the table 25 of FIG. 2, an organization may choose to have high assurance of trust with OV and EV digital certificates to protect their brand and reputation. EV TLS/SSL certificates protect businesses and brands because they certify that website owners are the authentic owners of their website. Before they can obtain an EV certificate, users demonstrate that they have legal rights to represent their business organization, web domain, physical address, and business entity, among 14 other criteria. OV certificates are secondary to EV because they require similar methods of authentication, including verifying the web domain, and affiliated business organization, such as Inc., Corp, LLC, etc. However, OV certificates only require nine methods of validation compared to the 14 methods required for EV.

Cooperative ML-Based Validator and Agent Device

FIG. 4 is a block diagram illustrating an embodiment of the Certificate Authority (CA) 16 shown in FIG. 1. In this embodiment, the CA 16 includes an ML-based validator 40 and an agent device 42 operated by a validation specialist 44 (e.g., validation expert, validation agent, etc.). The ML-based validator 40 performs the automated functions of validation, while the agent device 42 includes the validation functions controlled by the validation specialist 44. As shown in this implementation, the ML-based validator 40 includes an automatic validation analyzer 46 and a Reinforcement Learning (RL) component 48. Furthermore, the ML-based validator 40 includes ML models 50 and a database 52 that may be used for storing at least the ML models 50.

The database 52 may also be used for storing vast amounts of samples of valid documents that can be used to train ML models 50 initially. In some embodiments, the database 52 may also be configured to store samples of invalid documents, which can also be used for training. When more documents are obtained, the RL component 48 may be configured to re-train (e.g., fine tune, tweak, etc.) the ML models 50 regarding what makes a document valid or invalid. Of note, the CA 16 will already have vast amounts of data from previous validations, providing a rich source of training data.

In operation, an input representing a validation request is received by the automatic validation analyzer 46. The automatic validation analyzer 46 uses the appropriate ML model 50 (e.g., based on a specific jurisdiction, type of validation service, etc.) and performs as much validation as is possible. Upon certification (with or without the assistance of the agent device 42), the automatic validation analyzer 46 is configured to provide an output (e.g., digital certificate) to the requester.

If the validation process proceeds in the automatic validation analyzer 46 with hitch, then an automatically generated certificate can be issued. However, if there are any issues or if the certainty of any specific validation metric does not meet a certain standard (e.g., having a confidence level above a certain predetermined threshold), then the assistance of the validation specialist 44 is utilized. Thus, communication between the two pillars of validation (i.e., the automatic validation analyzer 46 and the agent device 42) is made through the RL component 48. Thus, clarifications of validation issues can be captured by the RL component 48 and used to revise the ML models 50 as needed.

In a Public Key Infrastructure (PKI) system, an input from a requester (e.g., CSR, certification request, etc.) is a message sent from an applicant to the CA 16 within the PKI in order to apply for a digital identity certificate. The CSR usually contains the public key for which the certificate should be issued, identifying information (e.g., domain name) and a proof of authenticity including integrity protection (e.g., a digital signature).

Figure 5:
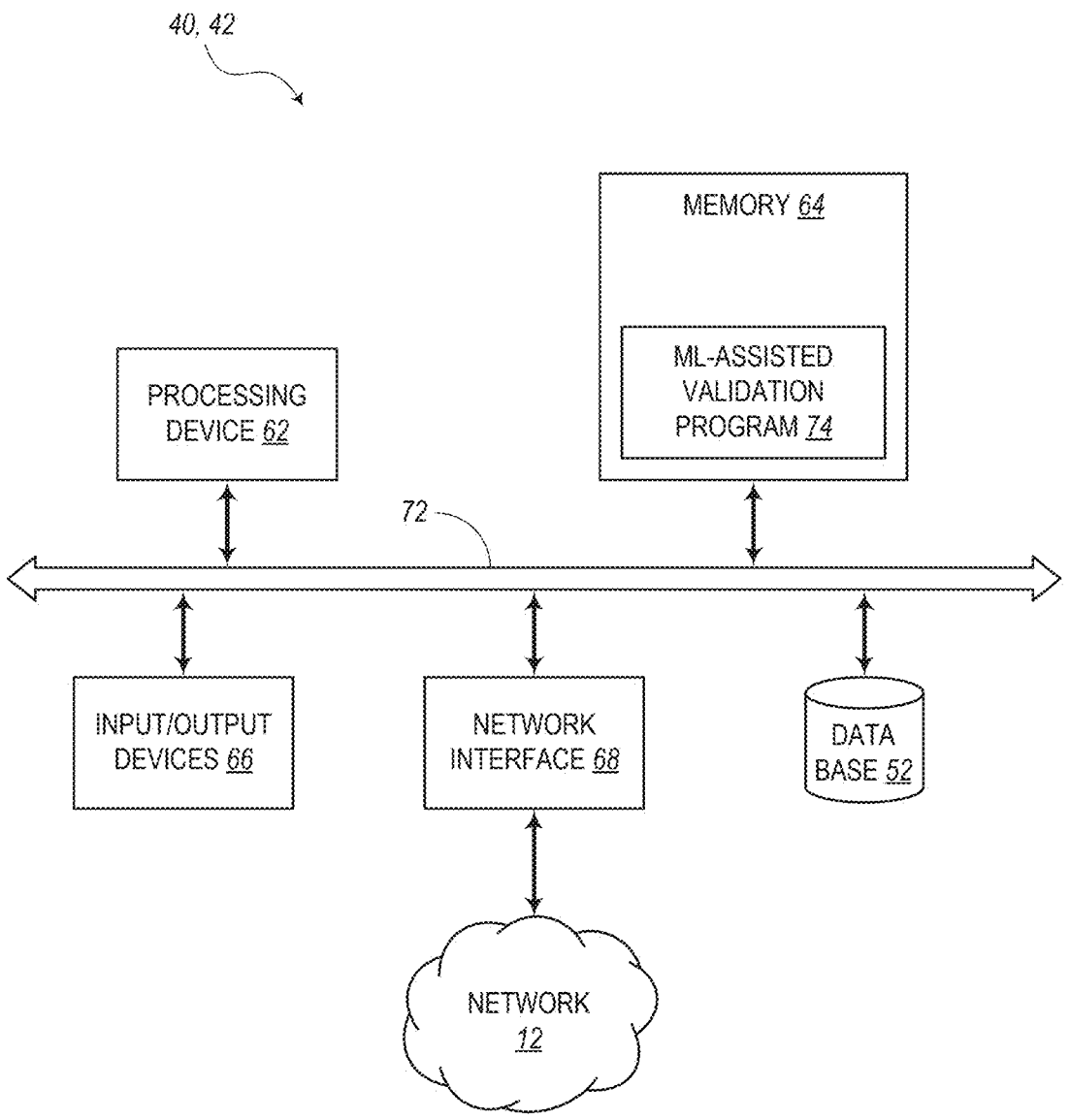
FIG. 5 is a block diagram illustrating a computing system of either or both of the ML-based validator and agent device shown in FIG. 4, according to various embodiments.

FIG. 5 is a block diagram illustrating an embodiment of a computing system representing either or both of the ML-based validator 40 and the agent device 42 shown in FIG. 4. The computing system may be a digital computer that, in terms of hardware architecture, generally includes a processing device 62, memory 64, input/output (I/O) devices 66, a network interface 68, and a database 52. It should be appreciated by those of ordinary skill in the art that FIG. 5 depicts the computing system in an oversimplified manner, and a practical embodiment may include additional components and suitably configured processing logic to support known or conventional operating features that are not described in detail herein. The components (62, 64, 66, 68, 52) are communicatively coupled via a local interface 72. The local interface 72 may be, for example, but not limited to, one or more buses or other wired or wireless connections, as is known in the art. The local interface 72 may have additional elements, which are omitted for simplicity, such as controllers, buffers (caches), drivers, repeaters, and receivers, among many others, to enable communications. Further, the local interface 72 may include address, control, and/or data connections to enable appropriate communications among the aforementioned components.

The processing device 62 is a hardware device for executing software instructions. The processing device 62 may be any custom made or commercially available processor, a Central Processing Unit (CPU), an auxiliary processor among several processors associated with the computing system, a semiconductor-based microprocessor (in the form of a microchip or chipset), or generally any device for executing software instructions. When the computing system is in operation, the processing device 62 is configured to execute software stored within the memory 64, to communicate data to and from the memory 64, and to generally control operations of the computing system pursuant to the software instructions. The I/O devices 66 may be used to receive user input from and/or for providing system output to one or more devices or components.

The network interface 68 may be used to enable the computing system to communicate on a network, such as the Internet. The network interface 68 may include, for example, an Ethernet card or adapter or a Wireless Local Area Network (WLAN) card or adapter. The network interface 68 may include address, control, and/or data connections to enable appropriate communications on the network. A database 52 (e.g., one or more databases, data stores, etc.) may be used to store data. The database 52 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the database 52 may incorporate electronic, magnetic, optical, and/or other types of storage media. In one example, the database 52 may be located internal to the computing system, such as, for example, an internal hard drive connected to the local interface 72 in the computing system. Additionally, in another embodiment, the database 52 may be located external to the computing system such as, for example, an external hard drive connected to the I/O devices 66 (e.g., SCSI or USB connection). In a further embodiment, the database 52 may be connected to the computing system through a network, such as, for example, a network-attached file server.

The memory 64 may include volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 64 may incorporate electronic, magnetic, optical, and/or other types of storage media. Note that the memory 64 may have a distributed architecture, where various components are situated remotely from one another but can be accessed by the processing device 62. The software in memory 64 may include one or more software programs, each of which includes an ordered listing of executable instructions for implementing logical functions. The software in the memory 64 includes a suitable Operating System (O/S) and one or more programs. The O/S essentially controls the execution of other computer programs, such as the one or more programs, and provides scheduling, input-output control, file and data management, memory management, and communication control and related services. The one or more programs may be configured to implement the various processes, algorithms, methods, techniques, etc. described herein.

The computing system further includes a ML-assisted validation program 74 that may be implemented in any suitable combination of hardware (e.g., configured in the processing device 62) and/or software/firmware (e.g., configured in the memory 64). The ML-assisted validation program 74 may be stored in any suitable non-transitory computer-readable media (e.g., the memory 64) and may include computer logic or code having instructions that enable or cause the processing device 62 to perform certain actions as discussed in the present disclosure.

Of note, the general architecture of the computing system can define any device described herein. However, the computing system is merely presented as an example architecture for illustration purposes. Other physical embodiments are contemplated, including virtual machines (VM), software containers, appliances, network devices, and the like.

In an embodiment, the various techniques described herein can be implemented via a cloud service. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

ML-Assisted Validation Program

According to various embodiments of the present disclosure, the ML-based validator 40 includes a processing device and memory configured to store the ML-assisted validation program 74. The ML-assisted validation program 74 includes instructions that, when executed, enable the processing device to perform a step of receiving a request (e.g., "input" in FIG. 4) to perform a validation analysis with respect to an organization. The validation analysis includes procedures for checking multiple validation metrics. In response to gathering multiple documents relevant for performing the validation analysis, the ML-assisted validation program 74 further includes a step of extracting data from each of the multiple documents relevant for checking the multiple validation metrics. Also, the ML-based validator 40 is configured to accept manual assistance from the validation specialist 44 when needed for performing the validation analysis.

In additional embodiments, the step of gathering the multiple documents may include a) receiving one or more documents submitted along with the request, b) retrieving one or more documents from relevant websites, and/or c) requesting and receiving missing documents from a representative of the organization. The step of accepting the manual assistance further includes asking the validation specialist 44 to obtain any missing documents needed for performing the validation analysis.

In some cases, the instructions of the ML-assisted validation program 74 may further enable the processing device to perform one or more of the steps of: a) determining whether each of the multiple documents is valid or invalid, and b) determining a confidence level for each of the multiple documents representing assurance that the respective document is valid. In response to determining that a document of the multiple documents is invalid or has a confidence level below a predetermined threshold, the instructions further enable the processing device to perform the steps of a) gathering a replacement document for replacing the invalid or low-confidence document, and b) determining whether the replacement document is valid or invalid or whether a confidence level of the replacement document is above or below the predetermined threshold.

Furthermore, the step of checking the multiple validation metrics may include verifying whether or not the extracted data supports one or more criteria regarding the validation analysis. The request to perform the validation analysis, for example, may be a Certificate Signing Request (CSR) for obtaining a digital certificate with respect to the organization. The request may be received from a representative device (e.g., rep device 14 shown in FIG. 1) used by an administrator of the organization, and wherein the validation analysis includes a verification process for verifying an identity of the administrator Also, the ML-assisted validation program 74 may include instructions enabling the processing device to utilize Reinforcement Learning (RL) (e.g., using the RL component 48) to revise the ML-assisted validation program 74 based on manual assistance from the validation specialist 44. In some cases, the validation analysis may be an Organization Validation (OV) analysis or an Extended Validation (EV) analysis. Also, the ML-based validator 40 may be part of a Certificate Authority (e.g., CA 16).

Auto-Validation Pipeline with Agent Reinforcement

Figure 6:
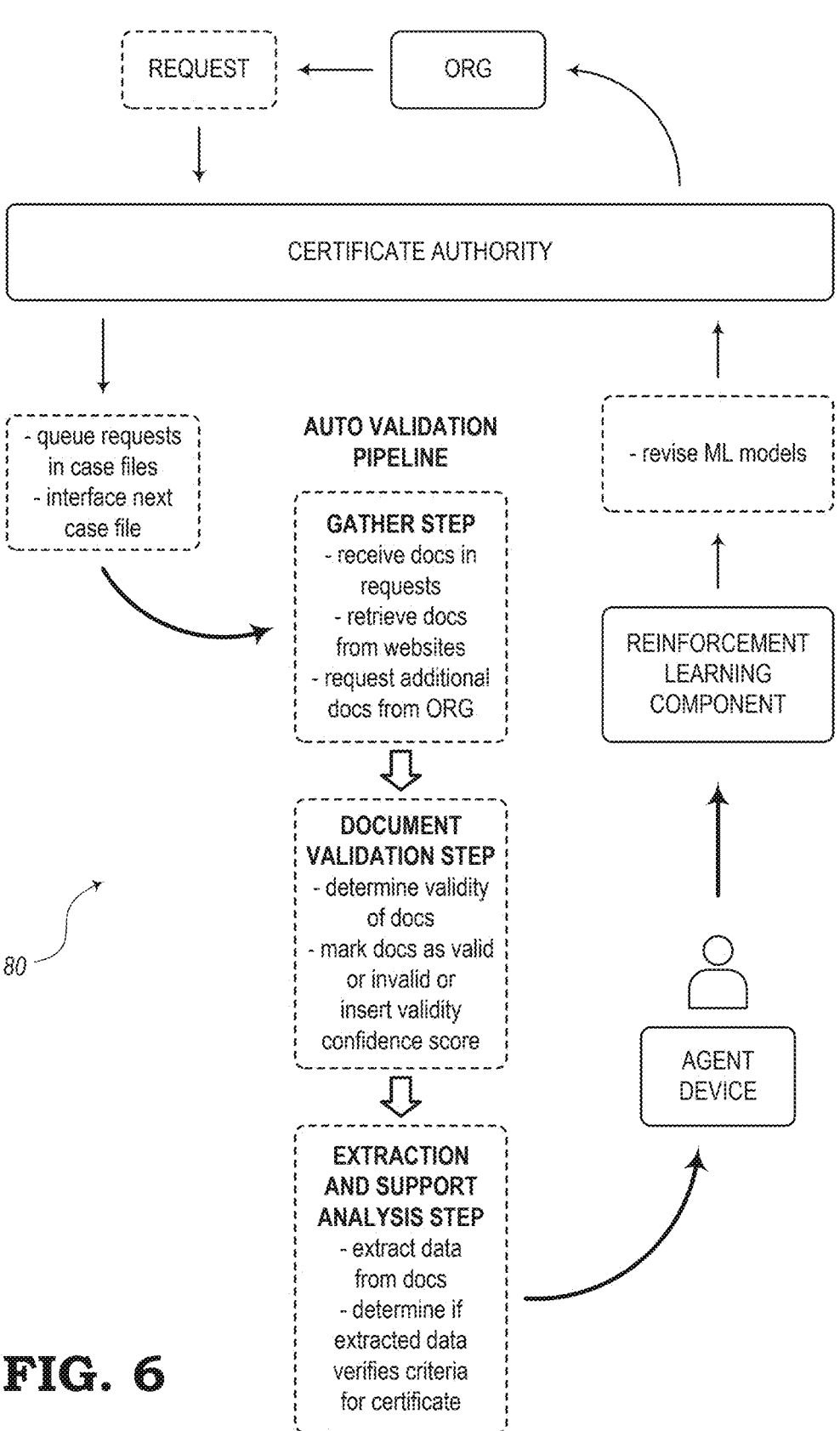
FIG. 6 is a system flow diagram illustrating procedures for automatic and manual handling of a Certificate Signing Request (CSR), according to various embodiments.

FIG. 6 is a system flow diagram illustrating an embodiment of a procedure 80 for automatic and manual handling of a Certificate Signing Request (CSR). As shown, the procedure 80 starts with an organization sending a validation request to the CA 16. The CA 16 is configured to form case files and place the case files in a queue along with other requests. When the case is up for processing, the case file is provided to an auto validation pipeline, which includes a Gather step, a Document Validation step, and an Extraction and Support Analysis step, which are conducted automatically (e.g., by the automatic validation analyzer 46).

The Gather step may include receiving documents that are submitted along with the request from the organization. Also, the Gather step may include retrieving documents from approved websites (e.g., via web servers 18). Furthermore, if any documents are missing from the case file at this point, the Gather step may also include requesting additional documents from the organization or requestor. It may be noted that, in some cases, perhaps there are still documents that have not been received. These can be retrieved by the validation specialist in later steps.

Next, the Document Validation step includes determining the validity of each of the gathered documents. When executed, the Document Validation step may include marking the documents in the case file as either valid or invalid. In some embodiments, the Document Validation step may additionally or alternatively include a step of determining a confidence level of each document. The confidence level is configured to represent an assurance (e.g., as a percentage) that the respective document is valid. For example, a confidence level of 99 may represent a highest level of confidence that a document is valid. The Document Validation step may accept certain types of documents, such business registration documents, documents defining LLC observance, organization documents, formation documents (i.e., legal document that establishes a business's legal and organizational structure and is filed with the State), ownership documents or deeds, management documents, business operations documents, taxation documents, and/or other essential business-related documents.

After the Document Validation step, the auto validation pipeline includes the Extraction and Support Analysis step. In this step, relevant data is extracted from the documents that can be used for analyzing validation criteria. The step also includes determining if the extracted data verifies some criterion or criteria regarding certification, which may include various validation metrics that are part of a particular validation service (e.g., DV, OV, EV, etc.).

At this point, the automated validation procedures have done what they can. Then, the results of automated validation are passed along to the agent device, where a validation specialist can review and analyze the results, make changes, clarify uncertainties, make corrections as needed, etc. Also, the agent is configured to finish the validation process. Feedback regarding the agent's input to the validation efforts is provided from the agent to the RL component, which can then revise the ML models as needed based on the human analysis and clarification. In this way, the procedure 80 is configured to optimize a validation flow with AI/ML and human contributions for processing the documents uploaded into the case file. When all the elements or metrics of the validation analysis are completed, the completed case file can be flagged as certifiable. The CA then issues a certificate to the organization.

FIGS. 7A-7C are flow diagrams illustrating various steps of the auto-validation pipeline shown in FIG. 6. In FIG. 7A, the Gather step includes a sub-step of gathering documents submitted in the Request, as indicated in block 90. Next, the Gather step includes retrieving relevant documents from business-related websites and government websites, as indicated in block 92. The Gather step further includes the sub-step of determining which documents have yet to be obtained (if any), as indicated in block 94. Next, the Gather step may include asking a representative (admin) associated with the organization for missing documents, as indicated in block 96. At this point, the Gather step may wait (block 98) for a predetermined amount of time for any missing documents from the representative, which may then result in actually receiving the documents from the rep (block 100). If, at this point, there are still some missing documents, block 102 includes the sub-step of asking for help from the validation specialist for obtaining these missing documents.

In FIG. 7B, the Document Validation step includes substep of performing an automatic validation of the documents, as indicated in block 110. If a document is not valid, as indicated in block 112, the Document Validation step may include returning back to the Gather step to obtain a replacement, which can again be validated. According to some embodiments, the sub-step of block 112 may be repeated up to a certain number of times (e.g., three) to try to retrieve valid documentation. However, if a valid document cannot be obtained within this limitation, the Document Validation step may simply move on (to allow the validation specialist to resolve the issue). Then, in block 114, if "invalid doc" determinations exceed a predetermined threshold, the document can be marked as invalid. Also, the Document Validation step includes a sub-step of determining a confidence level that the document is believed to be valid using certain criteria, as indicated in block 116. Next, the Document Validation step includes attaching the confidence level (or score) to the document stored in the case file, which can be communicated to the validation specialist, as indicated in block 118. Furthermore, the Document Validation step also includes asking for help from the validation specialist to replace invalid documents (as needed) or documents that have low confidence scores that fall below the acceptability threshold, as indicated in block 120.

In FIG. 7C, the Analysis step includes a sub-step of extracting data from each of the documents, as indicated in block 130. For example, this may include Optical Character Recognition (OCR) functions. Next, the Analysis step may include determining if the extracted data supports one or more criteria or metrics regarding the requested certificate, as indicated in block 132. For example, this may include determining if the requestor has been properly identified from a driver's license, determining whether the organization is in good standing with the State, verifying the registered address for the organization, determining that the organization is not associated with any fraudulent activities, the organization has not changed its headquarters, etc. Then, after the end of the automated analysis, the Analysis step includes the sub-step of asking for help from the validation specialist to extract additional data and/or to determine whether the documents support one or more criteria or metrics regarding the requested level of certification or validation, as indicated in block 134.

Examples of Agent Device User Interfaces (UIs)

Figure 8:
FIG. 8 is a diagram illustrating a User Interface (UI) for display on the agent device shown in FIG. 4 showing results of an automated analysis in which the documents and validation checks are valid or supported, according to various embodiments.

FIG. 8 is a diagram illustrating an example of a User Interface (UI) 140 that may be displayed on the agent device 42 associated with the validation specialist 44 working on a specific case file. A top portion of the UI 140 may include case file information, such as a reference number, the organization making the request, the organization central address, the name and phone number of a representative, and the type of validation that was requested (i.e., "Organization Validation (OV)").

The next section of the UI 140 includes a number of documents (i.e., Doc #1, Doc #2, . . . , Doc #m) that are intended to be received in order to perform the specific type of validation (i.e., OV in this example). The UI 140 also indicates whether or not each document has been automatically received and whether or not each document has been confirmed as valid. Also, in some embodiments, a confidence level (e.g., 0 to 99) can be included to indicate the degree of confidence that the document is valid.

In addition, the UI 140 includes another section that includes a description of various checks (e.g., validation checks, criteria, metrics, etc.). In this example, the OV type of validation includes Check #1, Check #2, . . . , Check #n. In order to perform a certain check, the UI 140 shows whether or not the data associated with the check has been adequately extracted. Also, the UI 140 shows whether or not some specific validation metric associated with the Check is supported or confirmed. In some embodiments, the UI 140 may also include a confidence level score (e.g., 0 to 99) for showing the level of confidence that the metric has been supported for the particular check.

As shown in FIG. 8, all the documents have been received and validated (e.g., by the automatic validation analyzer 46) and the confidence level meets or exceeds a predetermined threshold (e.g., 95). Also, the UI 140 also shows that the data for performing all the checks have been properly extracted from the documents. The UI 140 also shows that it has been determined that the validation metrics are all supported, and the confidence levels meet or exceed a certain threshold (e.g., 90). In this example, it may be noted that the validation process has been successfully completed by automated processes and a validation specialist may then sign off on the case file to allow the CA 16 to issue the TLS/SSL certificate, such as by clicking on a Pass to Issue button 142.

In some situations, however, the validation specialist may wish to review some or all of the documents or checks. As such, the validation specialist may click on a specific Doc or Check, whereby the UI 140 may provide information that can be reviewed by the validation specialist. At this point, the validation specialist may be able to perform additional functions or simply check to see that the documents and checks are indeed satisfactory.

Figures 9, 10:
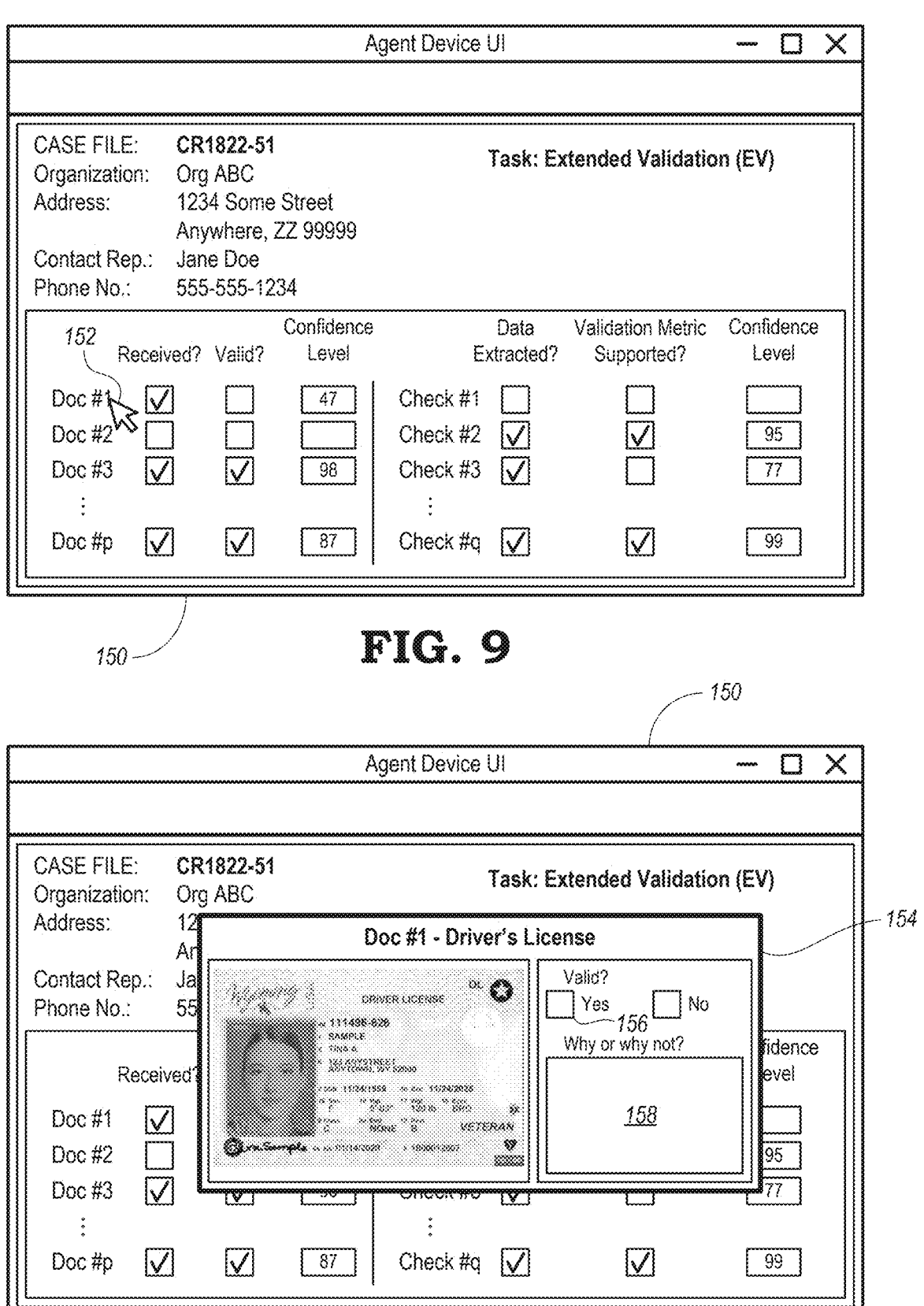
FIG. 9 is a diagram illustrating the agent device UI of FIG. 8 showing results of another automated analysis in which at least some of the documents and validation checks are invalid or unsupported, according to various embodiments.
FIG. 10 is a diagram illustrating the agent device UI of FIG. 9 in which a user performs a manual check to verify questionable validity from an automated test, according to various embodiments.

FIG. 9 is a diagram illustrating another example of a UI 150 of the agent device 42. However, in this example, the automated analysis by the automatic validation analyzer 46 is unable to sufficiently handle all aspects of the validation. This example includes a different request, case file, etc., and the type of requested service is an Extended Validation (EV) in this example. In contrast to the example of FIG. 8, not all of the documents have been received. Also, one of the received documents (i.e., Doc #1) has not been validated, particularly since it received a low confidence score (i.e., 47). Furthermore, in this example, not all of the checks or metrics were able to be analyzed since the data could not be properly extracted. Also, it could not be determined whether some of validation metrics are supported and/or the confidence levels thereof were too low. In this case, the assistance of the validation specialist can be used to search for valid documents, manually extract data from the documents, and check whether the various validation metrics are met with sufficient confidence. Thus, the validation specialist in this example will need to perform a number of additional tasks to compensate for automated validation steps. For example, to investigate Doc #1 to see why this was not considered to be valid, the validation specialist may use a pointer 152 to click on Doc #1, which causes the document to pop-up, as shown in FIG. 10.

FIG. 10 is a diagram illustrating the UI 150 of agent device UI of FIG. 9 with a window 154 superimposed over a portion of the screen. In this manual check, the user can review Doc #1, which in this example is a driver's license of a representative (admin) of the organization requesting certification. The window 154 may include an image of the document (on the left) and user input fields (on the right). In this particular, for example, the automated analysis was not familiar with a new format for driver's licenses issued in the State of Wyoming. As such, the automatic validation analyzer 46 was unable to determine if the driver's license was valid. At this point, the validation specialist may research websites associated with Wyoming driver's licenses to determine if the new format is legitimate. If it is found that it is indeed a valid format, the validation specialist can click on the box 156 to indicate that the document is valid. Also, the box 158 and/or other suitable types of input fields, boxes, options, selections, etc. can be presented to the user to allow him or her to clarify why the document is valid or why it is invalid. The RL component 48 is configured to receive this input from the user and modify the ML models 50 with the new information. Also, old versions of the Wyoming driver's licenses may be marked as no longer valid or being phased out.

Also, with respect to FIGS. 9 and 10, other actions by the validation specialist may be taken to rectify other issues with the documents and checks. In some cases, the UI 150 can be updated when certain issues are resolved. For instance, after informing the RL component 48 that the new Wyoming driver's license format is legitimate, the UI 150 may update Doc #1 as being valid and having a higher confidence level. When all issues are resolved, the UI 150 then presents a Pass to Issue button (as shown in FIG. 8) to allow the validation specialist to complete the validation analysis and close the case file.

Generalized Method

FIG. 11 is a flow diagram illustrating a generalized embodiment of a method 160 for automatically validating documents. As shown, the method 160 includes a step of receiving a request to perform a validation analysis with respect to an organization, as indicated in block 162. The validation analysis includes ML procedures for checking multiple validation metrics. In response to gathering multiple documents relevant for performing the validation analysis, the method 160 further includes a step of extracting data from each of the multiple documents relevant for checking the multiple validation metrics, as indicated in block 164. Furthermore, the method 160 includes a step of accepting manual assistance from a validation specialist when needed for performing the validation analysis.

Additional Considerations

A number of issues can arise with respect to the validation of documents, organizations, individuals, or other entities. For example, occasionally a representative may accidentally upload an incorrect document to the CA 16. Instead of uploading a document defining LLC information of an organization, a representative might inadvertently (or intentionally) upload an image file showing a picture of cats. For the sake of validation, the auto validation pipeline may easily determine that the document is not valid, particularly because it does not include the needed data that would be used for performing certain validation analysis checks.

In other situations, registration laws may differ from State to State. For instance, a company registered in the State of Florida may also be registered in Delaware. However, Florida may only have one type of status metric, whereby Delaware may have multiple statuses. This may cause a discrepancy in a manual check if the agent is unaware or overlooks the greater complexity for the different States. In other cases, someone may either fake a document or a validation agent may incorrectly analyze the situation. Therefore, by being updated with multiple jurisdictions, the automatic validation analyzer 46 can automatically determine the correct analysis of a complex situation.

Other issues that may arise in the validation analysis are that a rep may send in the wrong documentation. For instance, instead of sending in his or her own driver's license, the rep may inadvertently (or intentionally) submit the driver's license of another individual. During extraction of information from the incorrect document, it can be easily determined that the person does not match the actual company rep.

Regarding the training of the ML models 50, documents can be stored as examples of valid or invalid documents. Then, when a new document is obtained, it can be compared with the stored examples to determine validity or invalidity and/or a confidence level thereof. For example, document samples may include format detection information, size of fonts of various fields, depths of images, image resolution, watermarks, steganography elements, etc.

The database 52 may store large amounts of data, which may include documents that have already been deemed as valid (or invalid). In AI, the ML models 50 may be revised by the RL component 48. It can provide a document that can be used to train against, and anything that comes across that is not equivalent to the validated data will be found to be invalid or have a low confidence score. However, as mentioned with respect to FIG. 10, a new format may initially be viewed as invalid when in fact it may simply be a legitimate change in procedures. Thus, there may be a new document that is indeed valid, but when it is automatically tagged as invalid, a re-training process may be needed to teach the RL component 48 and ML models 50 that the changes from the old styles are acceptable.

In some embodiments, the output from the automatic validation analyzer 46 may express the results of the entire validation analysis (automatic and manual). For example, the output may simply be presented to a reviewer that says, "This is valid." In other embodiments, the output may be provided to the validation specialist and/or the rep of the organization. Also, the output may be an actual digital certificate and/or PKI information provided to the rep device 14.

According to some embodiments, the ML-based validator 40 may initially be configured to establish ML models 50 from previously obtained documents and extracted data along with indications of whether the documents and/or extracted data is valid and/or meets the various validation metrics. The initial set up may include supervised training to label or categorize valid documents as valid and/or label or categorize invalid documents as invalid. The training information and data can be stored in the database 52. Thereafter, additional documents and data contained therein can be added to the database 52 with additional labels and categorizations for refining the training algorithms.

After the initial setting up of the models, new sets of valid data can be obtained and compared against the valid set. Hour by hour, new documents, extracted data, and validation information obtained during ongoing validation cases can be used to enrich the ML models 50. If it does not match by a certain percentage (plus or minus a specific allowable error), or it is not equivalent to that data, then the analysis will drop the document from the automated pipeline and send it to the validation specialist for human inspection. If it passes the matching test, the document and/or extracted data can be found to confirm or validate that the criterion or metric for validation is satisfactory.

It may be noted that the multiple ML models 50 may apply to different countries, states, counties, territories, jurisdictions, etc. with respect to the various laws, rules, regulations, policies, standards, document formats, etc. within each region. Also, ML models 50 may be distinguished by multiple different languages as well. For example, there may be certain issues that are specific to certain languages but may be inconsequential in other languages.

CONCLUSION

Of note, the validation approaches described herein are presented with reference to document validation for purposes of certificate issuance. Of course, those skilled in the art will appreciate this is merely one use case with other use cases also contemplated with the validation approaches described herein.

Those skilled in the art will recognize that the various embodiments may include processing circuitry of various types. The processing circuitry might include, but are not limited to, general-purpose microprocessors; Central Processing Units (CPUs); Digital Signal Processors (DSPs); specialized processors such as Network Processors (NPs) or Network Processing Units (NPUs), Graphics Processing Units (GPUs); Field Programmable Gate Arrays (FPGAs); or similar devices. The processing circuitry may operate under the control of unique program instructions stored in their memory (software and/or firmware) to execute, in combination with certain non-processor circuits, either a portion or the entirety of the functionalities described for the methods and/or systems herein. Alternatively, these functions might be executed by a state machine devoid of stored program instructions, or through one or more Application-Specific Integrated Circuits (ASICs), where each function or a combination of functions is realized through dedicated logic or circuit designs. Naturally, a hybrid approach combining these methodologies may be employed. For certain disclosed embodiments, a hardware device, possibly integrated with software, firmware, or both, might be denominated as circuitry, logic, or circuits "configured to" or "adapted to" execute a series of operations, steps, methods, processes, algorithms, functions, or techniques as described herein for various implementations.

Additionally, some embodiments may incorporate a non-transitory computer-readable storage medium that stores computer-readable instructions for programming any combination of a computer, server, appliance, device, module, processor, or circuit (collectively "system"), each potentially equipped with one or more processors. These instructions, when executed, enable the system to perform the functions as delineated and claimed in this document. Such non-transitory computer-readable storage mediums can include, but are not limited to, hard disks, optical storage devices, magnetic storage devices, Read-Only Memory (ROM), Programmable Read-Only Memory (PROM), Erasable Programmable Read-Only Memory (EPROM), Electrically Erasable Programmable Read-Only Memory (EEPROM), Flash memory, etc. The software, once stored on these mediums, includes executable instructions that, upon execution by one or more processors or any programmable circuitry, instruct the processor or circuitry to undertake a series of operations, steps, methods, processes, algorithms, functions, or techniques as detailed herein for the various embodiments.

While the present disclosure has been detailed and depicted through specific embodiments and examples, it is to be understood by those skilled in the art that numerous variations and modifications can perform equivalent functions or yield comparable results. Such alternative embodiments and variations, which may not be explicitly mentioned but achieve the objectives and adhere to the principles disclosed herein, fall within its spirit and scope. Accordingly, they are envisioned and encompassed by this disclosure, warranting protection under the claims associated herewith. Additionally, the present disclosure anticipates combinations and permutations of the described elements, operations, steps, methods, processes, algorithms, functions, techniques, modules, circuits, etc., in any manner conceivable, whether collectively, in subsets, or individually, further broadening the ambit of potential embodiments.

What is claimed is:

1. A Machine Learning (ML)-based validator comprising:
a processing device; and
memory configured to store an ML-assisted validation program having instructions that, when executed, enable the processing device to perform the steps of:
receiving a request to perform a validation analysis with respect to an organization, wherein the validation analysis includes procedures for checking multiple validation metrics, wherein the request comprises a Certificate Signing Request (CSR) for obtaining an X.509 digital certificate and the validation analysis comprises an Organization Validation (OV) analysis or an Extended Validation (EV) analysis performed by, or on behalf of, a Certificate Authority (CA),
in response to gathering multiple documents relevant for performing the validation analysis, extracting data from each of the multiple documents relevant for checking the multiple validation metrics, wherein gathering the multiple documents includes forming a case file for the request and retrieving at least some of the multiple documents from approved business-related or government-related websites,
determining, for each of the multiple documents, whether the document is valid or invalid and determining a confidence level representing assurance that the document is valid,
determining whether the extracted data supports one or more criteria corresponding to the multiple validation metrics for the OV analysis or the EV analysis,
automatically marking a case file as certifiable when confidence levels for the multiple documents and confidence levels for the multiple validation metrics meet respective predetermined thresholds and, in response, enabling issuance of the X.509 digital certificate, and
accepting manual assistance from a validation specialist when needed for performing the validation analysis when at least one document is invalid or has a confidence level below a predetermined threshold or when at least one validation metric has a confidence level below a predetermined threshold.

2. The ML-based validator of claim 1, wherein gathering the multiple documents includes one or more of a) receiving one or more documents submitted along with the request, b) retrieving one or more documents from relevant websites, and c) requesting and receiving one or more missing documents from a representative of the organization.

3. The ML-based validator of claim 2, wherein accepting the manual assistance further includes asking the validation specialist to obtain any missing documents needed for performing the validation analysis.

4. The ML-based validator of claim 1, wherein the instructions further enable the processing device to perform one or more of the steps of:
a) determining whether each of the multiple documents is valid or invalid, and
b) determining a confidence level for each of the multiple documents representing assurance that the respective document is valid.

5. The ML-based validator of claim 4, wherein, in response to determining that a document of the multiple documents is invalid or has a confidence level below a predetermined threshold, the instructions further enable the processing device to perform the steps of:
gathering a replacement document for replacing an invalid or low-confidence document, and
determining whether the replacement document is valid or invalid or whether a confidence level of the replacement document is above or below the predetermined threshold.

6. The ML-based validator of claim 1, wherein checking the multiple validation metrics includes verifying whether or not the extracted data supports one or more criteria regarding the validation analysis.

7. The ML-based validator of claim 1, wherein the request to perform the validation analysis is a Certificate Signing Request (CSR) for obtaining a digital certificate with respect to the organization, wherein the CSR includes a public key and identifying information for the organization and is integrity-protected by a digital signature.

8. The ML-based validator of claim 1, wherein the request is received from a representative device used by an administrator of the organization, and wherein the validation analysis includes a verification process for verifying an identity of the administrator, wherein, when the OV analysis or the EV analysis is completed and the multiple validation metrics are satisfied, a case file associated with the request is flagged as certifiable to enable issuance of an X.509 certificate to the organization.

9. The ML-based validator of claim 1, wherein the instructions further enable the processing device to utilize Reinforcement Learning (RL) based on manual assistance from the validation specialist.

10. The ML-based validator of claim 1, wherein the validation analysis is an Organization Validation (OV) analysis or an Extended Validation (EV) analysis, and wherein the ML-based validator is part of a Certificate Authority (CA).

11. A method comprising the steps of:
receiving a request to perform a validation analysis with respect to an organization, wherein the validation analysis includes Machine-Learning (ML) procedures for checking multiple validation metrics, wherein the request comprises a Certificate Signing Request (CSR) for obtaining an X.509 digital certificate and the validation analysis comprises an Organization Validation (OV) analysis or an Extended Validation (EV) analysis performed by, or on behalf of, a Certificate Authority (CA),
in response to gathering multiple documents relevant for performing the validation analysis, extracting data from each of the multiple documents relevant for checking the multiple validation metrics, wherein gathering the multiple documents includes forming a case file for the request and retrieving at least some of the multiple documents from approved business-related or government-related websites,
determining, for each of the multiple documents, whether the document is valid or invalid and determining a confidence level representing assurance that the document is valid,
determining whether the extracted data supports one or more criteria corresponding to the multiple validation metrics for the OV analysis of the EV analysis,
automatically marking a case file as certifiable when confidence levels for the multiple documents and confidence levels for the multiple validation metrics meet respective predetermined thresholds and, in response, enabling issuance of the X.509 digital certificate, and
accepting manual assistance from a validation specialist when needed for performing the validation analysis when at least one document is invalid or has a confidence level below a predetermined threshold or when at least one validation metric has a confidence level below a predetermined threshold.

12. The method of claim 11, wherein gathering the multiple documents includes one or more of a) receiving one or more documents submitted along with the request, b) retrieving one or more documents from relevant websites, and c) requesting and receiving missing documents from a representative of the organization.

13. The method of claim 12, wherein accepting manual assistance further includes asking the validation specialist to obtain any missing documents needed for performing the validation analysis, the method further comprising the step of using Reinforcement Learning (RL) to revise a ML model based on input from the validation specialist.

14. The method of claim 11, further comprising one or more of the steps of:
a) determining whether each of the multiple documents is valid or invalid, and
b) determining a confidence level for each of the multiple documents representing assurance that the respective document is valid.

15. The method of claim 14, wherein, in response to determining that a document of the multiple documents is invalid or has a confidence level below a predetermined threshold, the method further comprises the steps of:
gathering a replacement document for replacing an invalid or low-confidence document, and
determining whether the replacement document is valid or invalid and/or determining whether a confidence level of the replacement document is above or below the predetermined threshold.

16. The method of claim 11, wherein checking the multiple validation metrics includes verifying whether or not the extracted data supports one or more criteria regarding the validation analysis.

17. A non-transitory computer-readable medium configured to store an ML-assisted validation program having instructions that, when executed, enable a processing device to perform the steps of:
receiving a request to perform a validation analysis with respect to an organization, wherein the validation analysis includes procedures for checking multiple validation metrics, wherein the request comprises a Certificate Signing Request (CSR) for obtaining an X.509 digital certificate and the validation analysis comprises an Organization Validation (OV) analysis or an Extended Validation (EV) analysis performed by, or on behalf of, a Certificate Authority (CA),
in response to gathering multiple documents relevant for performing the validation analysis, extracting data from each of the multiple documents relevant for checking the multiple validation metrics, wherein gathering the multiple documents includes forming a case file for the request and retrieving at least some of the multiple documents from approved business-related or government-related websites,
determining, for each of the multiple documents, whether the document is valid or invalid and determining a confidence level representing assurance that the document is valid,
determining whether the extracted data supports one or more criteria corresponding to the multiple validation metrics for the OV analysis or the EV analysis,
automatically marking a case file as certifiable when confidence levels for the multiple documents and confidence levels for the multiple validation metrics meet respective predetermined thresholds and, in response, enabling issuance of the X.509 digital certificate, and
accepting manual assistance from a validation specialist when needed for performing the validation analysis when at least one document is invalid or has a confidence level below a predetermined threshold or when at least one validation metric has a confidence level below a predetermined threshold.

18. The non-transitory computer-readable medium of claim 17, wherein the request is received from a representative device used by an administrator of the organization, and wherein the validation analysis includes a verification process for verifying an identity of the administrator.

19. The non-transitory computer-readable medium of claim 17, wherein the instructions further enable the processing device to utilize Reinforcement Learning (RL) to revise the ML-assisted validation program based on manual assistance from the validation specialist.

20. The non-transitory computer-readable medium of claim 17, wherein the validation analysis is an Organization Validation (OV) analysis or an Extended Validation (EV) analysis, and wherein the non-transitory computer-readable medium is stored in a computing device associated with a Certificate Authority (CA).

\* \* \* \* \*